(12) United States Patent
Mujica et al.

(10) Patent No.: US 8,437,424 B2
(45) Date of Patent: May 7, 2013

(54) ROBUST TRANSMIT/FEEDBACK ALIGNMENT

(75) Inventors: Fernando A. Mujica, Allen, TX (US); Hardik P. Gandhi, Mt. View, CA (US); Kun Shi, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 473 days.

(21) Appl. No.: 12/718,152

(22) Filed: Mar. 5, 2010

(65) Prior Publication Data

US 2011/0216851 A1 Sep. 8, 2011

(51) Int. Cl.
*H04K 1/02* (2006.01)
*H04L 25/03* (2006.01)
*H04L 25/49* (2006.01)

(52) U.S. Cl.
USPC ........................................................ 375/297

(58) Field of Classification Search .................. 375/227, 375/259, 260, 271, 296, 297, 308, 329, 336, 375/343; 455/67.1, 69, 114.2, 130
See application file for complete search history.

(56) References Cited

U.S. PATENT DOCUMENTS

| | | | |
|---|---|---|---|
| 2002/0050372 A1 | 5/2002 | Lee | |
| 2002/0193087 A1* | 12/2002 | Kim | 455/127 |
| 2004/0052314 A1 | 3/2004 | Copeland | |
| 2004/0247042 A1* | 12/2004 | Sahlman | 375/297 |
| 2004/0266483 A1* | 12/2004 | Choi | 455/562.1 |
| 2006/0008026 A1* | 1/2006 | Wood et al. | 375/296 |
| 2006/0062324 A1* | 3/2006 | Naito et al. | 375/296 |
| 2006/0209984 A1 | 9/2006 | Kenington | |
| 2008/0130788 A1 | 6/2008 | Copeland | |
| 2008/0130789 A1 | 6/2008 | Copeland et al. | |
| 2008/0260388 A1* | 10/2008 | Kim et al. | 398/115 |
| 2009/0068956 A1* | 3/2009 | Naito et al. | 455/67.11 |
| 2010/0048149 A1 | 2/2010 | Tang et al. | |

OTHER PUBLICATIONS

PCT Search Report mailed Sep. 23, 2011.

* cited by examiner

*Primary Examiner* — David C. Payne
*Assistant Examiner* — Syed Haider
(74) *Attorney, Agent, or Firm* — Alan A. R. Cooper; Wade J. Brady, III; Frederick J. Telecky, Jr.

(57) ABSTRACT

Performing digital predistortion (DPD) for widely spaced narrowband signals, such as the signal used in multi-carrier GSM, can be very difficult. Here, a system is provided the performs DPD for widely spaced narrowband signals. In particular, this system uses a polynomial curve for values of a cross-correlation function (above a predetermined threshold) to determine a delay estimate, which allows for a more robust and accurate system.

14 Claims, 4 Drawing Sheets

ROBUST TRANSMIT/FEEDBACK ALIGNMENT

TECHNICAL FIELD

The invention relates generally to digital predistortion (DPD) and, more particularly, to delay estimation for a DPD system.

BACKGROUND

Widely spaced narrow band signals are becoming increasingly common in wireless telecommunications systems, such as multi-carrier or MC-GSM. In real world communications, noise in the narrowband signals can cause the peaks to vary in height. As a result, it is not uncommon for peaks around the center peak to be larger than the center peak, which can cause delay misalignment and a non-functioning system. Thus, it is highly desirable to have accurate and robust alignment to achieve high performance in these closed loop systems.

Some examples of conventional systems are: U.S. Patent Pre-Grant Publ. No. 2004/0052314; U.S. Patent Pre-Grant Publ. No. 2006/0209984; U.S. Patent Pre-Grant Publ. No. 2008/0130788; and U.S. Patent Pre-Grant Publ. No. 2008/0130789.

SUMMARY

A preferred embodiment of the present invention, accordingly, provides an apparatus. The apparatus comprises a digital predistortion (DPD) circuit that receives an input signal and that generates a predistorted signal from the input signal and predistortion coefficients; a delay element that receives an amplified signal and that provides a delayed output signal; a delay estimator that receives the delayed output signal and the predistorted signal and that generates a delay estimation by determining a peak value from a polynomial curve fit of values from a cross-correlation function of the delayed output signal, wherein the values of the cross-correlation function are greater than a predetermined threshold; and a DPD adapter that receives the delay estimation and that generates the predistortion coefficients.

In accordance with a preferred embodiment of the present invention, the delay estimator further comprises: a pre-processing circuit that receives the delay output signal and the predistorted signal; a cross-correlator that receives an output from the pre-processing circuit and that generate the values from the cross-correlation function of the delayed output signal; and a post-processing circuit that the values from the cross-correlation function of the delayed output signal and that generates the delay estimation.

In accordance with a preferred embodiment of the present invention, the delay, the delay estimator, and the DPD adapter further comprise a processor with a computer program product embodied thereon that includes: computer code for delaying the amplified signal to produce the delayed output signal; computer code for generating a delay estimation by determining the peak value from the polynomial curve fit of values from the cross-correlation function of the delayed output signal; and computer code for generating the predistortion coefficients from the delay estimation.

In accordance with a preferred embodiment of the present invention, the processor further comprises a digital signals processor (DSP).

In accordance with a preferred embodiment of the present invention, the input signal is a widely spaced narrowband signal.

In accordance with a preferred embodiment of the present invention, a system is provided. The system comprises a transmit path having an amplifier; an antenna that is coupled to the transmit path; a feedback path that is coupled to the transmit path; and transmit processing circuitry that is coupled to transmit path and the feedback path, wherein the transmit processing circuitry includes: a DPD circuit that receives a input signal and that generates a predistorted signal from the input signal and predistortion coefficients; a delay element that receives an amplified signal from the feedback path and that provides a delayed output signal; a delay estimator that receives the delayed output signal and the predistorted signal and that generates a delay estimation by determining a peak value from a polynomial curve fit of values from a cross-correlation function of the delayed output signal, wherein the values of the cross-correlation function are greater than a predetermined threshold; and a DPD adapter that receives the delay estimation and that generates the predistortion coefficients.

In accordance with a preferred embodiment of the present invention, the delay estimator further comprises: a pre-processing circuit that receives the delay output signal and the predistorted signal; a cross-correlator that receives an output from the pre-processing circuit and that generate the values from the cross-correlation function of the delayed output signal; and a post-processing circuit that the values from the cross-correlation function of the delayed output signal and that generates the delay estimation.

In accordance with a preferred embodiment of the present invention, the transmit processing circuitry further comprises: a transmit processor that is coupled to the transmit path and the feedback path; and a DSP that is coupled to the transmit processor.

In accordance with a preferred embodiment of the present invention, the DSP includes a computer program product that comprises: computer code for delaying the amplified signal to produce the delayed output signal; computer code for generating a delay estimation by determining the peak value from the polynomial curve fit of values from the cross-correlation function of the delayed output signal; and computer code for generating the predistortion coefficients from the delay estimation.

In accordance with a preferred embodiment of the present invention, the transmit path further comprises: a digital-to-analog converter (DAC) that is coupled to the transmit processor; a modulator that is coupled to the DAC; a low power amplifier that is coupled to the modulator; and a high power amplifier that is coupled between the low power amplifier and the antenna.

In accordance with a preferred embodiment of the present invention, the DAC further comprises: a first DAC that receives an in-phase signal from the transmit processor; and a second DAC that receives a quadrature signal from the transmit processor.

In accordance with a preferred embodiment of the present invention, the feedback path further comprises: a mixer that is coupled to the high power amplifier; a buffer that is coupled to the mixer; and an analog-to-digital converter that is coupled between the buffer and the transmit processor.

In accordance with a preferred embodiment of the present invention, an apparatus is provided. The apparatus comprises a transmit processor having a DPD circuit that receives a input signal and that generates a predistorted signal from the input signal and predistortion coefficients; and a DSP that is coupled to the transmit processor having a computer program product embodied thereon, wherein the computer program product includes: computer code for delaying the amplified signal to produce the delayed output signal; computer code for generating a delay estimation by determining the peak value from the polynomial curve fit of values from the cross-correlation function of the delayed output signal; and computer code for generating the predistortion coefficients from the delay estimation.

In accordance with a preferred embodiment of the present invention, the transmit processor further comprises: a baseband section; and a DPD section that includes the DPD circuit, wherein the DPD circuit is coupled to the baseband section.

In accordance with a preferred embodiment of the present invention, the DPD section further comprises a feedback pipeline; buffer circuit that is coupled to the feedback pipeline and the baseband section; an equalizer that is coupled to the DPD circuit; a mixer that is coupled to the equalizer; and a DAC interface that is coupled to the mixer;

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
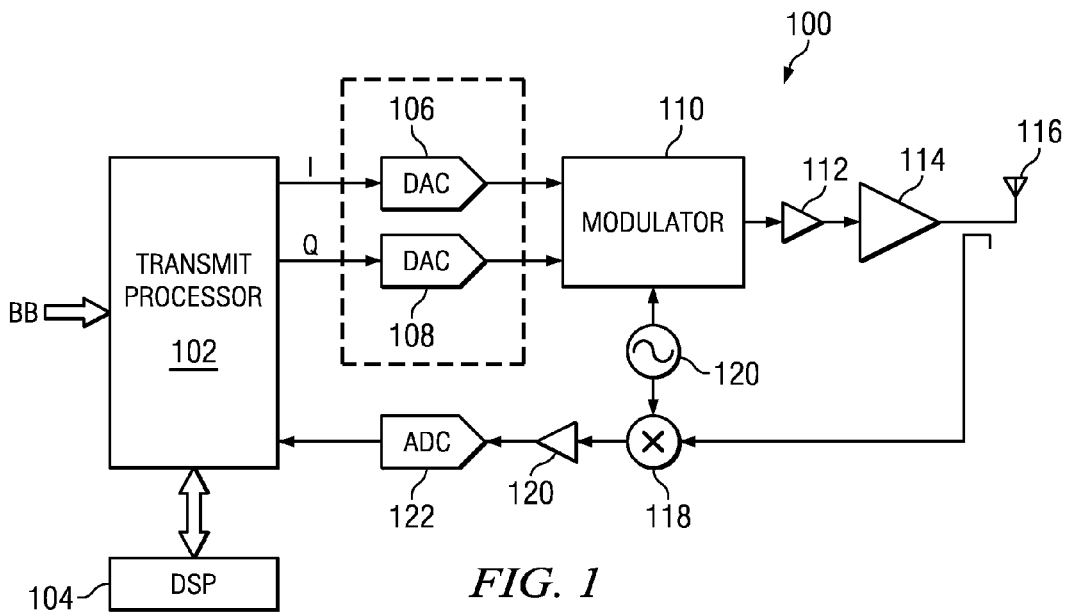
FIG. 1 is a block diagram of an example of a system in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 200 generally designates a system in accordance with a preferred embodiment of the present invention. System 200 generally comprises a transmit path, a feedback path, an antenna 116, a transmit processor 102 and a digital signals processor (DSP) 104. The transmit path is generally comprised of an IQ digital-to-analog converter (DAC), modulator 110, low power amplifier 112, and high power amplifier. The feedback path is generally comprised of mixer 118, buffer 120, and analog-to-digital converter (ADC) 122.

In operation, the system 100 converts a baseband signal BB into an radio frequency (RF) signal that is transmitted through antenna 116. Preferably, the transmit processor 102 receives the baseband signal BB, and, in combination with the DSP 104, processes the baseband signal BB for transmission. In particular, the transmit processor 102 and DSP 104 generates in-phase (I) and quadrature (q) components which are provided to DACs 106 and 108 (of the IQ DAC) to be converted to analog signals. Modulator 110 (with the use of local oscillator 120) converts the analog signal to an RF signal which is amplified by amplifiers 112 and 114 and transmitted through antenna 116. To ensure a relatively clean signal, the mixer 118 (which also uses local oscillator 120), buffer 120, and ADC 122 provide a feedbacks signal to the transmit processor 102 so that the transmit processor 102 and DSP 104 can compensate for errors and nonlinearities.

Figure 2:
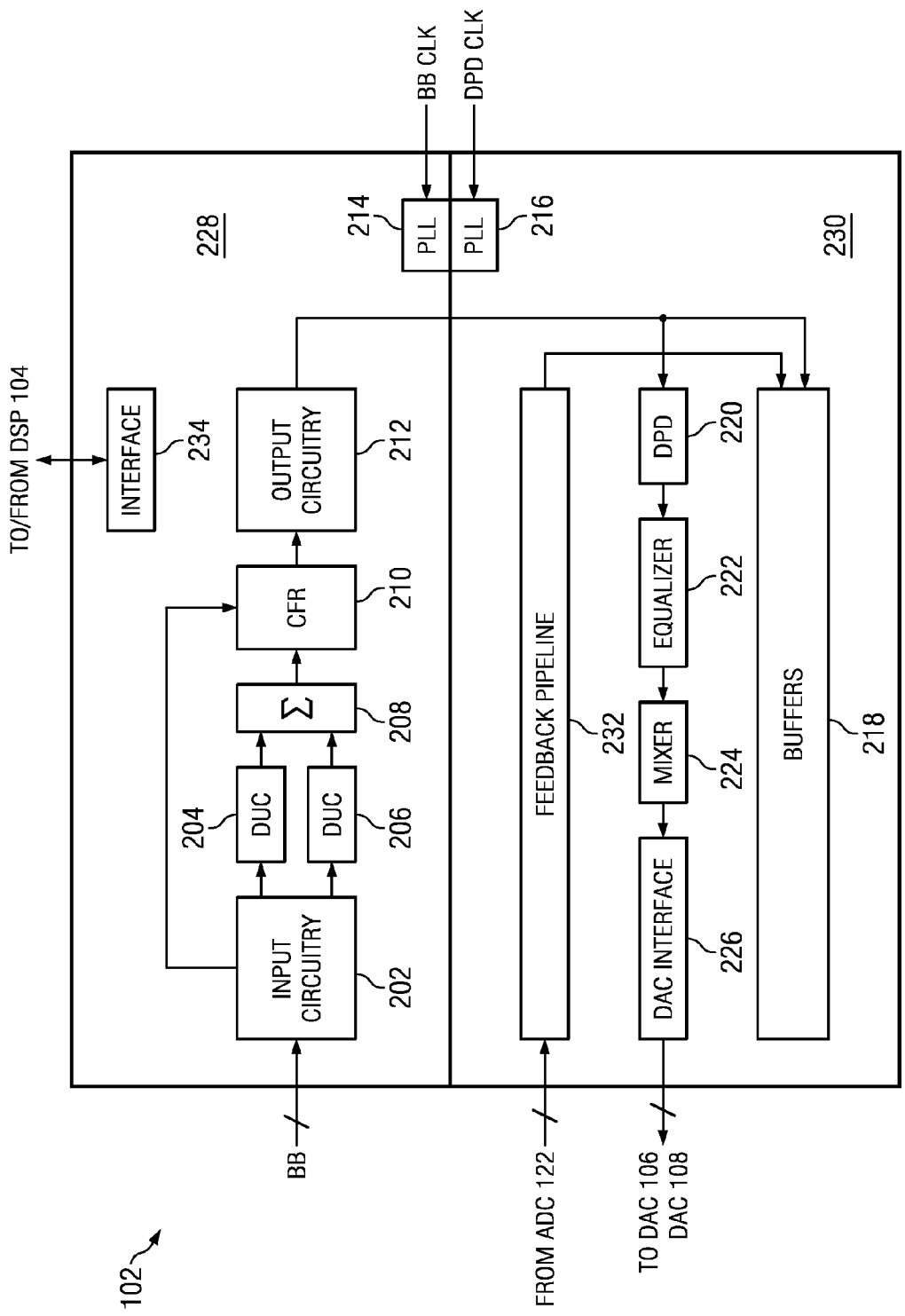
FIG. 2 is a block diagram of an example of the transmit processor of FIG. 1.

Turning to FIG. 2, the transmit processor 102 can be seen in greater detail. In particular, the transmit processor 102 can be subdivided into two sections: a baseband section 228 and a digital predistortion (DPD) section 230. Each of these sections 228 and 230 operates on a different time domain (namely, generated by the baseband clock signal BBCLK and phased locked loop or PLL 214 or by the DPD clock signal DPDCLK and PLL 216). The baseband section 228 employs an interface circuit 202, digital upconverters (DUCs) 204 and 206, an adder 208, crest factor reduction (CFR) circuit 210, and output circuit 212 to perform processing on the baseband signal BB, the result of which is provided to buffers 218 in the DPD section 230. The DPD section 230 employs a feedback pipeline 232 (which is coupled to ADC 122), DPD circuit 220, equalizer 222, mixer 224 and DAC interface 226 (which is coupled to DACs 106 and 108) to perform digital predistortion. Additionally, interface 234 allows for communication with DSP 104.

Figure 3:
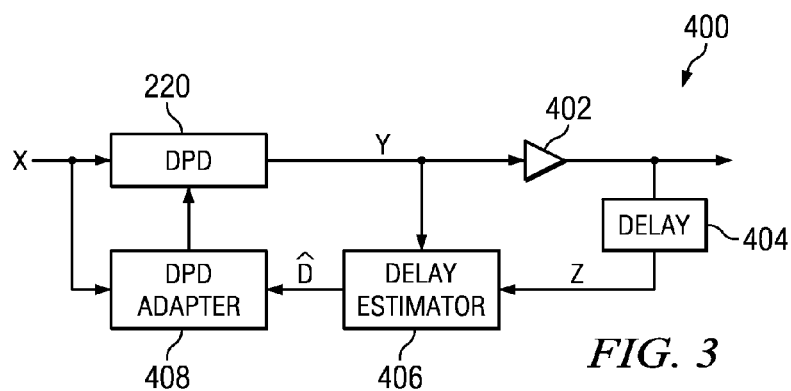
FIG. 3 is a block diagram of an example of the DPD system of FIGS. 1 and 2.

The DPD system 400 used in system 100 can be seen in greater detail in FIG. 3. This DPD system 400 is generally implemented as a combination of hardware in the transmit processor 102 and software in DSP 104, but may also be fully implemented as hardware in the transmit processor 102. Because the amplifier 402 (which is generally comprised of amplifiers 112 and 114 of FIG. 1) has nonlinear characteristics, the DPD system 400 generally operates to digitally predistort the input signal X to generate a predistorted signal Y, so that the amplifier 402 can output a generally clean signal. Preferably, the DPD circuit 220 is a multi-tap finite impulse response (FIR) filter, with its filter or predistortion coefficients being calculated through feedback. As a result of the construction of the system 100 of FIG. 1, a delay is introduced by the feedback path of system 100 and is represented by delay 404 to generate a delayed signal Z. The delay estimator 406 determines or estimates the delay $\hat{D}$ caused by the feedback path of system 100 by performing a calculation from the predistorted signal Y and the delayed signal Z. With the estimated delay $\hat{D}$ and the input signal X, the DPD adapter 408 can calculate the predistortion coefficients.

Figure 4:
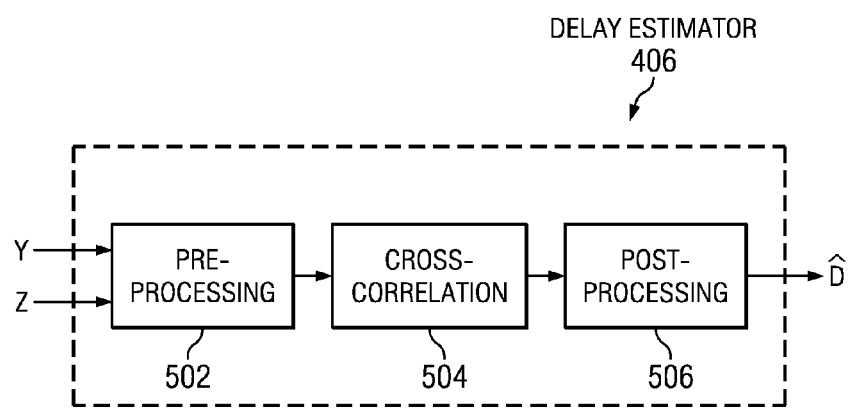
FIG. 4 is a block diagram of an example of the delay estimator of FIG. 3.

Turning to FIG. 4, the delay estimator 406 can be seen in greater detail. Specifically, it performs the estimation in three stages, which can be implemented through software or hardware. Delay estimator 406 performs preprocessing in stage 502, determines the cross-correlation function values in stage 504, and performs post-processing in stage 506. Additionally, in the delay estimator 406, a simple model between the signals Y and Z, which is as follows, is presumed:

$$Z(t)=Y(t-D)-V(t), \quad (1)$$

where D denotes the delay from delay 404 and V(t) denotes noise. The cross-correlation function between Y(t) and Z(t) with a lag time τ is:

$$R_{YZ}(\tau) = R_{YY}(\tau - D), \quad (2)$$

where a maximum is obtained at τ=D. Thus, the delay estimation $\hat{D}$ can determined by searching for the peak of values from the cross-correlation function of equation (2); this estimation can be represented as follows:

$$\hat{D} = \arg\!\left(\max_{\tau}(R_{YY}(\tau - D))\right). \quad (3)$$

It should also be noted that the cross-correlation function of equation (3) is a complex valued function because of the complex baseband signal representation with the peak searching based on its absolute value.

Assuming for such systems (i.e., system 100) that the amplifier 402 can be modeled by a Hammerstein-Wiener system (namely, a memoryless nonlinearity sandwiched between two infinite impulse response or IIR filters), the memoryless nonlinearity introduces distortion, while IIR filters introduce fractional delay. To examine these two effects, a simulation can be performed that compares estimated delay (that uses equation (3)) and true delay, where the system has a known delay of 6 samples that is introduced by two interpolation filters (forward path 10 samples, backward path 6 samples).

Turning first to the memoryless nonlinearity, the delay estimation $\hat{D}$ is performed using equation (3) for two cases: with and without PA nonlinearity. The test signal, here, is 2-carrier GSM signal with frequency locations +/−9.9 MHz and with a buffer size set to be 40,000. The delay estimation $\hat{D}$ results are shown in Table 1 below, and it is observed that memoryless nonlinearity does not affect delay estimation $\hat{D}$.

TABLE 1

| Nonlinearity | $\hat{D}$ | D |
|---|---|---|
| w/ | 16 | 16 |
| w/o | 16 | 16 |

Turning now to fractional delay, the delay estimation $\hat{D}$ is performed using equation (3) assuming that the amplifier 402 is linear and modeled by IIR filters. Here, as with the memoryless nonlinearity estimation, the test signal is 2-carrier GSM with frequency locations +/−9.9 MHz and with a buffer size set to be 40,000. The delay estimation $\hat{D}$ for the fractional delay results are shown in Table 2 below, and it can seen that fractional delay results in the incorrect estimate of delay $\hat{D}$.

TABLE 2

| | $\hat{D}$ | D |
|---|---|---|
| IIR PA | 22 | 16 |

Figure 5:
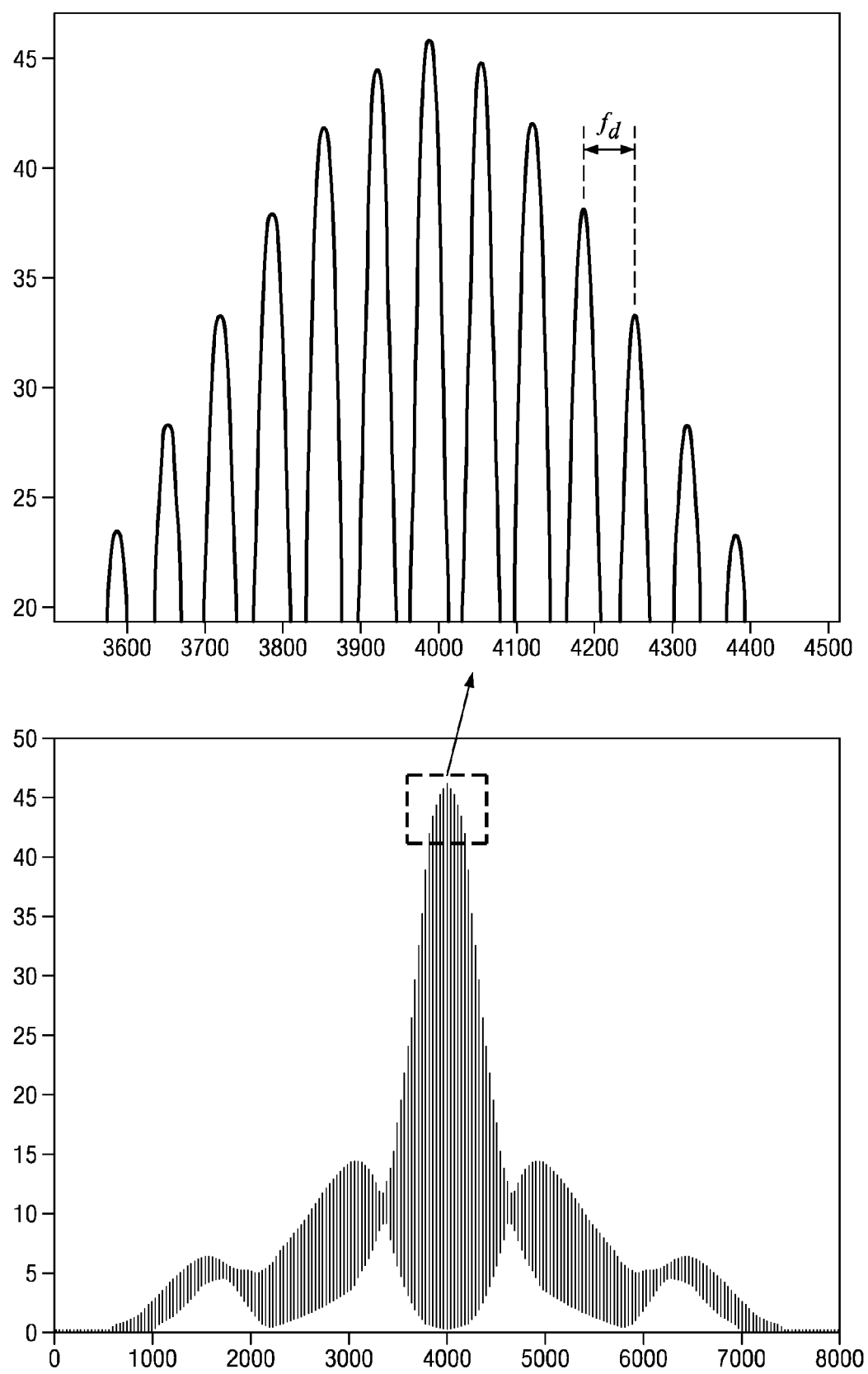
FIG. 5 is simulation for the system of FIG. 1.

Based on these results, several observations can be made. First, the sufficiency of the number of samples depends on the carrier spacing, and the further the two carriers are from each other, the greater the number of samples needed for estimation. Second, the carrier spacing plays a significant role in delay estimation $\hat{D}$, and it might be speculated that fractional delay effect is inversely proportional to carrier spacing. Turning to FIG. 5, plots for the cross-correlation function of equation (2) can be seen for 2-carrier GSM system with frequency locations +/−0.9 MHz and with a buffer size of 4,000. It is seen that cross-correlation function of equation (2) is comprised of a high frequency component, which is the frequency difference between two carriers (i.e., $f_d = |f_2 - f_1|$). Furthermore, with sampling frequency $f_s$, the distance between adjacent peaks can be obtained by $f_s/f_d$. Therefore, with the increase of carrier spacing, the adjacent peak gets closer, which, in turn makes the delay estimation $\hat{D}$ less and less robust.

Figure 6:
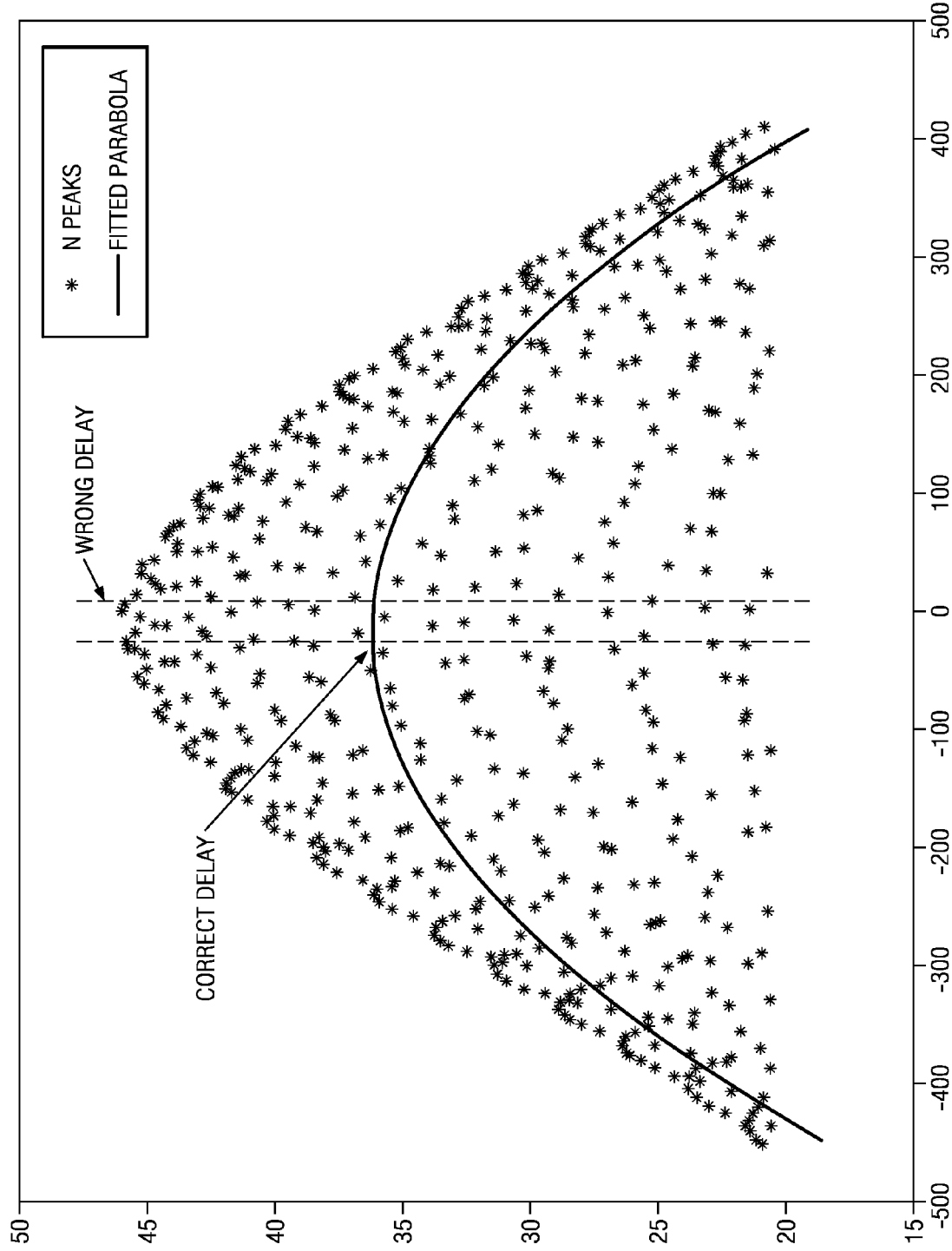
FIG. 6 is diagram depicting the operation of the delay estimator of FIG. 4.

As can be observed, it is the closeness of the closeness between different peaks of cross-correlation function of equation (2) and the fractional delay causes the incorrect delay estimation. However, if it is assumed that equation (2) is the auto-correlation function of the information signal modulating some higher frequency component and if it is assumed that equation (2) is symmetrical, an optimal delay resides in the peak of its envelope. Thus, the "demodulated" information signal can be "reconstructed," and the estimate of the delay $\hat{D}$ can be determined through locating its peak. This process is illustrated in FIG. 6, where a quadratic curve fit is applied to the N-largest values (above a predetermined threshold) of cross-correlation function of equation (2) to obtain a parabola with the delay estimation $\hat{D}$ being at the parabola's apex.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a feedback pipeline;
   a buffer pipeline that is coupled to the feedback circuit;
   a digital predistortion (DPD) circuit that is configured to receive an input signal and that is configured to generate a predistorted signal from the input signal and predistortion coefficients;
   an equalizer that is coupled to the DPD circuit;
   a mixer that is coupled to the equalizer;
   a digital-to-analog converter (DAC) interface that is coupled to the mixer;
   a delay element that is configured to receive an amplified signal and that is configured to provide a delayed output signal;
   a delay estimator that is configured to receive the delayed output signal and the predistorted signal and that is configured to generate a delay estimation by determining a peak value from a polynomial curve fit of values from a cross-correlation function of the delayed output signal, wherein the values of the cross-correlation function are greater than a predetermined threshold; and
   a DPD adapter that is configured to receive the delay estimation and that is configured to generate the predistortion coefficients.

2. The apparatus of claim 1, wherein the delay estimator further comprises:
   a pre-processing circuit that is configured to receive the delay output signal and the predistorted signal;
   a cross-correlator that is configured to receive an output from the pre-processing circuit and that is configured to generate the values from the cross-correlation function of the delayed output signal; and a post-processing circuit that is configured to determine the values from the cross-correlation function of the delayed output signal and that is configured to generates the delay estimation.

3. The apparatus of claim 1, wherein the delay element, the delay estimator, and the DPD adapter further comprise a processor with a computer program product embodied thereon that includes:
computer code for delaying the amplified signal to produce the delayed output signal;
computer code for generating a delay estimation by determining the peak value from the polynomial curve fit of values from the cross-correlation function of the delayed output signal; and
computer code for generating the predistortion coefficients from the delay estimation.

4. The apparatus of claim 3, wherein the processor further comprises a digital signals processor (DSP).

5. The apparatus of claim 1, wherein the input signal is a widely spaced narrowband signal.

6. An apparatus comprising:
a transmit processor having:
a feedback pipeline;
a buffer circuit that is coupled to the feedback pipeline;
a DPD circuit that is configured to receive an input signal and that is configured to generate a predistorted signal from the input signal and predistortion coefficients;
an equalizer that is coupled to the DPD circuit;
a mixer that is coupled to the equalizer; and
a DAC interface that is coupled to the mixer; and
a DSP that is coupled to the transmit processor having a computer program product embodied thereon, wherein the computer program product includes:
computer code for delaying the amplified signal to produce the delayed output signal;
computer code for generating a delay estimation by determining the peak value from the polynomial curve fit of values from the cross-correlation function of the delayed output signal; and
computer code for generating the predistortion coefficients from the delay estimation.

7. The apparatus of claim 6, wherein the transmit processor further comprises:
a baseband section; and
a DPD section that includes the DPD circuit, the feedback pipeline, the buffer circuit, the equalizer, the mixer, and the DAC interface, wherein the DPD circuit is coupled to the baseband section.

8. The apparatus of claim 6, wherein the input signal is a widely spaced narrowband signal.

9. An apparatus comprising:
a transmit processing circuitry having:
a baseband circuit;
a feedback pipeline;
a buffer circuit that is coupled to the feedback pipeline;
a DPD circuit that coupled to the baseband circuit and that is configured to generate a predistorted signal from the input signal and predistortion coefficients;
an equalizer that is coupled to the DPD circuit;
a mixer that is coupled to the equalizer;
a DAC interface that is coupled to the mixer;
a delay element that is configured to receive an amplified signal and that is configured to provide a delayed output signal;
a delay estimator that is configured to receive the delayed output signal and the predistorted signal and that is configured to generate a delay estimation by determining a peak value from a polynomial curve fit of values from a cross-correlation function of the delayed output signal, wherein the values of the cross-correlation function are greater than a predetermined threshold; and
a DPD adapter that is configured to receive the delay estimation and that is configured to generate the predistortion coefficients;
a transmit circuit that is coupled to the DAC interface;
an antenna that is coupled to the transmit circuit; and
a feedback circuit that is coupled between the feedback pipeline and the antenna.

10. The apparatus of claim 9, wherein the transmit circuit further comprises:
a DAC that is coupled to the DAC interface;
a modulator that is coupled to the DAC;
a local oscillator that is coupled to the modulator;
an amplifier that is coupled between the modulator and the antenna.

11. The apparatus of claim 10, wherein the feedback circuit further comprises:
a mixer that is coupled to the antenna and the local oscillator;
a buffer that is coupled to the mixer;
an ADC that is coupled between the buffer and the feedback pipeline.

12. The apparatus of claim 11, wherein the delay element, the delay estimator, and the DPD adapter further comprise a processor with a computer program product embodied thereon that includes:
computer code for delaying the amplified signal to produce the delayed output signal;
computer code for generating a delay estimation by determining the peak value from the polynomial curve fit of values from the cross-correlation function of the delayed output signal; and
computer code for generating the predistortion coefficients from the delay estimation.

13. The apparatus of claim 12, wherein the processor further comprises a DSP.

14. The apparatus of claim 13, wherein the input signal is a widely spaced narrowband signal.

* * * * *